June 28, 1927.
C. B. KINKEAD
1,633,816
DEVICE FOR USE WITH TELEPHONES
Filed March 26, 1927
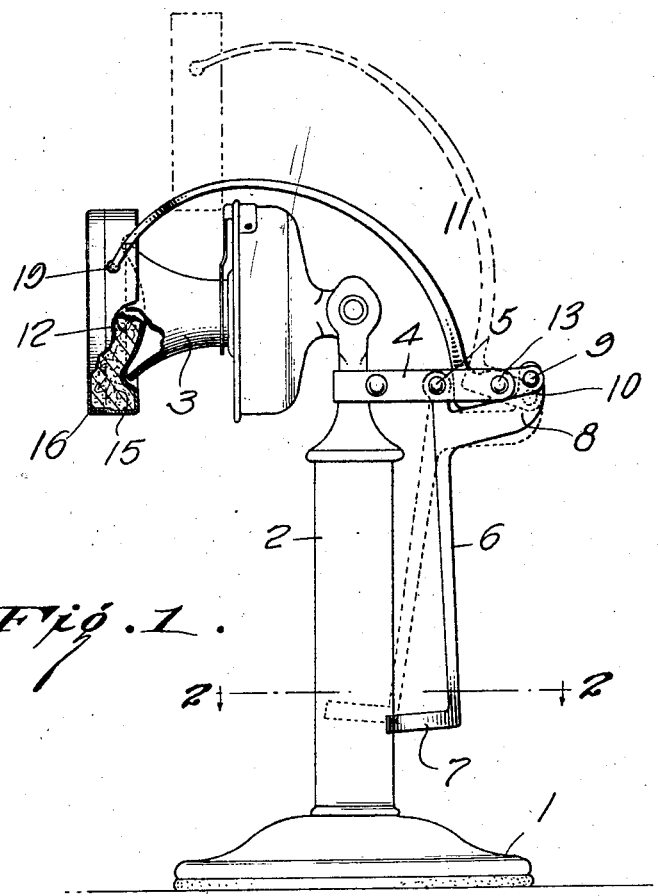
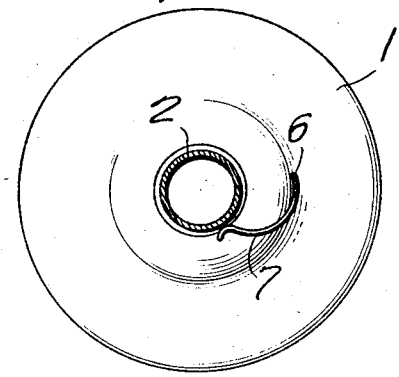
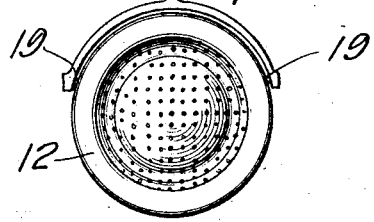
Inventor
CHARLES B. KINKEAD,
Attorneys Patented June 28, 1927.

1,633,816

UNITED STATES PATENT OFFICE.

CHARLES B. KINKEAD, OF HUNTINGTON, WEST VIRGINIA.

DEVICE FOR USE WITH TELEPHONES.

Application filed March 26, 1927. Serial No. 178,699.

My present invention relates to an attachment for telephone mouthpieces adapted to contain an antiseptic material for the purpose of sterilizing the said mouthpieces.

The principal object of the invention is the provision of an antiseptic holder which will normally lie in proximity to the mouthpiece when the phone is not in use, but which may be either automatically or manually moved from such proximity when it is desired to use the phone.

To this end my invention includes a clamp member adapted to be attached to the telephone standard and having an arm to which the antiseptic container may be attached so as to hang in front of the telephone mouthpiece. By a series of levers this arm may be manually raised from its position so that the phone may be used.

The invention further consists in the novel arrangement, combination and construction of parts hereinafter described and with reference to the accompanying drawings, in which:

Fig. 1 is a side view of a telephone equipped with my invention.

Fig. 2 is a sectional view on the line 2—2 of Fig. 1.

Fig. 3 is a detail of the container.

In one form of the invention a telephone base is shown generally at 1 having a standard 2 and a mouthpiece 3. Attached to the neck of the standard is a clamp member 4 having a pivot at 5 and having a downwardly extending handle 6 preferably of curved form so as to neatly hug the standard 2. Means to temporarily lock the handle to the standard is shown to consist of a spring clip 7 engageable with the standard.

The upper portion of the handle 6 has a backwardly and upwardly extending portion 8 pivoted as at 9 to a short extended portion 10 of a curved arm 11 which carries at its upper end an antiseptic container 12. This arm is pivoted to the clamp 4 between pivots 5 and 9. This arm pivot is indicated at 13.

It will be noted that handle 6 is movable about its pivot 5 away from or to hug the standard 2. Such action by reason of the pivotal connections, will lower or raise the antiseptic container into or out of proximity to the mouthpiece.

The container 12 may be composed of a perforated box 14 containing an absorbent 15 soaked in any desirable volatile antiseptic and covered by a screw cap 16. The rear face of the container contains an annular channel 17 surrounding a raised portion 18 which projects within the mouthpiece 3. The entire back of the container being perforated, the interior and edges of the mouthpiece will be effectively disinfected. As the container is loosely hung to the arm 11 as by pivots 19, the container may be easily raised or lowered and accommodates itself to either position.

When the phone is not in use, the handle 6 will normally occupy a position away from the standard 2, in which position the container 12 will lie adjacent the mouthpiece 2, so that the volatile antiseptic may permeate the atmosphere adjacent the mouthpiece and thereby sterilize the same.

In using the phone, the handle and standard are grasped simultaneously, moving the handle 6 about its pivot, which lifts container 12 above the mouthpiece so that it does not interfere with the use of the phone. The weight of the container is such that upon releasing the grip upon handle and standard, the parts will automatically adjust themselves to the sterilizing position. The handle 6 may, however, be temporarily clipped to the standard by part 7.

I claim:

1. In combination, a telephone having a standard and a mouthpiece, a clamp member secured to the standard, an arm pivoted to said clamp at one end and at the other carrying an antiseptic container, a handle lying substantially parallel to the standard and pivoted to said clamp, said handle likewise being pivoted to the arm so that manipulation of the handle will move the arm about its pivot and move the container into or out of proximity to the mouthpiece.

2. In combination, a telephone having a standard and a mouthpiece, a clamp secured to the standard, an overreaching arm carrying at one end an antiseptic container adapted to occupy a position in proximity to the mouthpiece, said arm being pivoted to the clamp member, and a handle for actuating the arm to lift the container above the mouthpiece when desired.

3. In combination, a telephone having a standard and a mouthpiece, a clamp secured to the standard, a curved arm pivoted at one end to the clamp and at the other end carrying a loosely hung antiseptic container, a bifurcated handle element having its legs straddling the pivot of the arm, one of said legs being pivoted to the clamp, the other to the arm, so that the arm may be manipulated about its pivot by movement of the handle.

4. In combination, a telephone having a standard and a mouthpiece, a clamp attached to the standard and extending backwardly therefrom, an arm pivoted at one end to the clamp at the rear of the telephone, said arm reaching over the mouthpiece to the front thereof, and a freely swinging pivoted antiseptic container hanging in proximity to the mouthpiece, and means to move the container from in front of said mouthpiece.

5. In combination, a telephone having a standard and a mouthpiece, an arm mechanically attached to the standard having an antiseptic container attached to one end, means to manually raise the container to a point above the mouthpiece, release of said manual means allowing the container to drop back into position under the action of gravity.

In testimony whereof, I affix my signature.

CHARLES B. KINKEAD.